United States Patent [19]

Sugiyama et al.

[11] Patent Number: 4,472,795
[45] Date of Patent: Sep. 18, 1984

[54] PERIODICAL SIGNAL DETECTION CIRCUIT WITHIN A VARIABLE WINDOW LENGTH

[75] Inventors: Hiroyuki Sugiyama, Isehara; Ryozo Abe, Yokohama; Susumu Sakakibara, Sagamihara, all of Japan

[73] Assignee: Victor Company of Japan, Ltd., Yokohama, Japan

[21] Appl. No.: 301,306

[22] Filed: Sep. 11, 1981

[30] Foreign Application Priority Data

Sep. 12, 1980 [JP] Japan .................. 55-126888

[51] Int. Cl.³ .................. G11B 15/52; G11B 7/00; H04N 5/76
[52] U.S. Cl. .................. 369/47; 369/43; 358/342
[58] Field of Search .................. 358/314, 320, 322–326, 358/335, 337, 342, 319, 336; 369/44, 47, 43; 360/36.1, , 37.1, 38.1

[56] References Cited

U.S. PATENT DOCUMENTS

| 4,203,076 | 5/1980 | Yamashita | 358/158 X |
| 4,259,698 | 3/1981 | Takada | 360/75 X |
| 4,313,136 | 1/1982 | Kimura | 360/37.1 X |
| 4,315,283 | 2/1982 | Kinjo et al. | 358/342 |
| 4,322,748 | 3/1982 | Tatsuguchi | 358/342 |
| 4,330,791 | 5/1982 | Onara et al. | 358/342 X |
| 4,428,002 | 1/1984 | Hinta | 358/342 |
| 4,428,003 | 6/1984 | Sugiyama et al. | 358/342 |

FOREIGN PATENT DOCUMENTS 2856411 12/1978 Fed. Rep. of Germany .

Primary Examiner—Aristotelis M. Psitos
Attorney, Agent, or Firm—Louis Bernat

[57] ABSTRACT

A periodical signal detection circuit in a reproducing apparatus which reproduces an information signal and a periodical signal from a recording medium recorded with the information and periodical signals comprises a separation circuit for separating the periodical signal from the reproduced signal, a reference pulse generating circuit for generating a reference pulse having a same repetition frequency as the periodical signal, a window signal forming circuit for forming window signals respectively having differing widths, with a repetition period identical to that of the reference pulse, a first gate circuit for producing the periodical signal from the periodical signal obtained from the separation circuit and the window signal obtained from the window signal forming circuit, a first counter for generating a switching control signal every time the reference pulse is counted N (N is an integer including zero) times, to produce an output when counting is performed for a predetermined number of times, a window signal supplying circuit responsive to the switching control signal obtained from the first counter of the window signals from the window signal forming circuit, for supplying a window signal having a width corresponding to the switching control signal to the first gate circuit, a second gate circuit for passing the signal from the separation circuit according to the output of the first counter, and an output circuit for producing the reference pulse, the output of the first gate circuit, or the output of the second gate circuit as a detected periodical signal.

5 Claims, 7 Drawing Figures

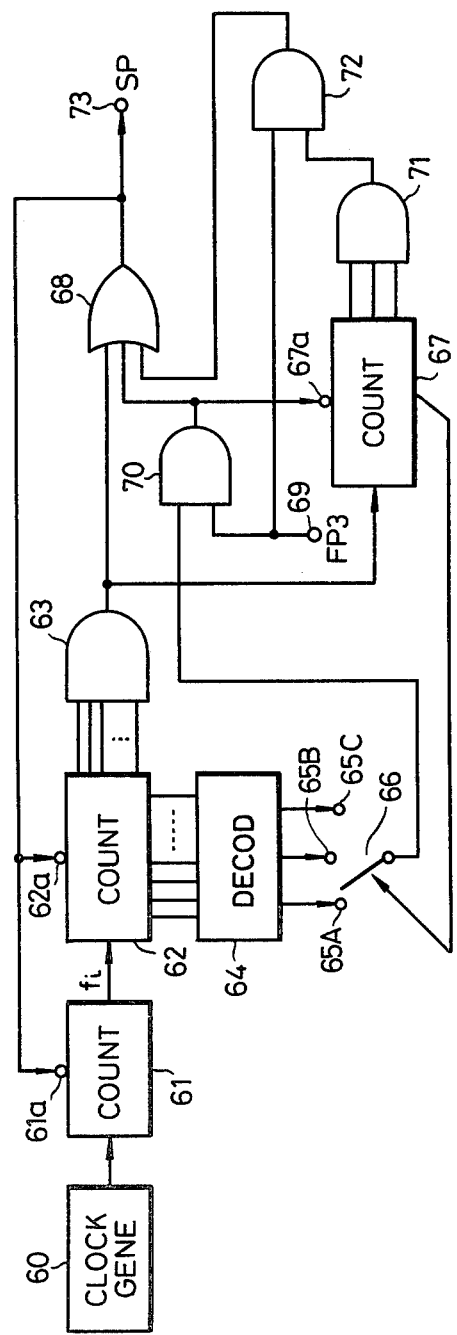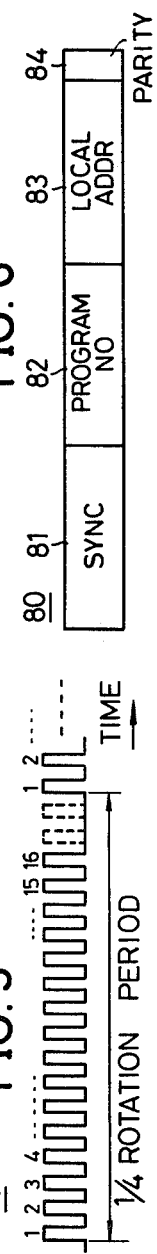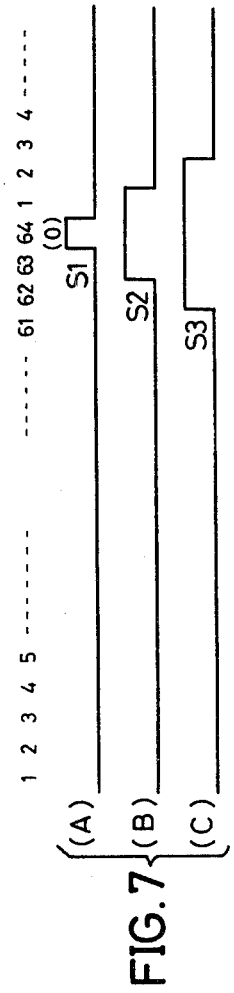

PERIODICAL SIGNAL DETECTION CIRCUIT WITHIN A VARIABLE WINDOW LENGTH

BACKGROUND OF THE INVENTION

The present invention generally relates to periodical signal detection circuits in reproducing apparatuses, and more particularly to a circuit which obtains a periodic predetermined reference signal without being effected by noise, and obtains a periodical reference signal without being effected by dropout of a reproduced reference signal.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking control signal from the reproduced first and second reference signals.

However, the above third reference signal is only recorded at one position for every track turn, within a vertical blanking period in a burst manner. Accordingly, it is necessary to accurately obtain the above third reference signal, and obtain a corresponding signal even when a dropout of the signal occurs. Moreover, it is essential that the above signals are obtained without being affected by noise.

Moreover, there are cases where the disc slips on the disc and undergoes rotational displacement, such as a case where the turntable starts to rotate and a case where an external shock is exerted against the reproducing apparatus during rotation of the turntable. In the above case, although the turntable is synchronously rotated with the correct phase, the phase of the reproduced third reference signal shifts. Therefore, the periodical signal detection circuit operates as if the third reference signal has not been detected, and detects the following third reference signal. Accordingly, the possibility of erroneously detecting noise again in the above case, is high.

SUMMARY OF THE INVENTION

Accordingly, it is a general object of the present invention to provide a novel and useful periodical signal detection circuit in a reproducing apparatus, in which the above described demands have been satisfied.

Another and more specific object of the present invention is to provide a periodical signal detection circuit in which a period for detecting a reproduced periodical signal is successively lengthened when synchronizing a circuit which generates a signal having a frequency equal to the reproduced periodical signal with the reproduced periodical signal. According to the circuit of the present invention, the above circuit can be positively synchronized with the reproduced periodical signal within a short period of time with high accuracy, wherein the possibility of being affected by the noise component is exceedingly small.

Other objects and further features of the present invention will be apparent from the following detailed description when read in conjunction with the accompanying drawings.

BRIEF DESCRIPTION OF THE DRAWINGS

FIG. 4 is a systematic circuit diagram showing an embodiment of a periodical signal detection circuit according to the present invention;

FIG. 5 is a diagram showing the signal waveform of an output pulse signal of a counter within the circuit system shown in FIG. 4;

FIG. 6 is a diagram for explaining a chapter address signal; and

FIGS. 7 (A) through 7 (C) are diagrams respectively showing the signal waveform of an output signal of a decoder within the circuit system shown in FIG. 4.

DETAILED DESCRIPTION

First, description will be given with respect to a rotary recording medium which is reproduced by a rotary recording medium reproducing apparatus to which the periodical signal detection circuit according to the present invention can be applied, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1, t_2, t_3 \ldots$. As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

Figure 2:
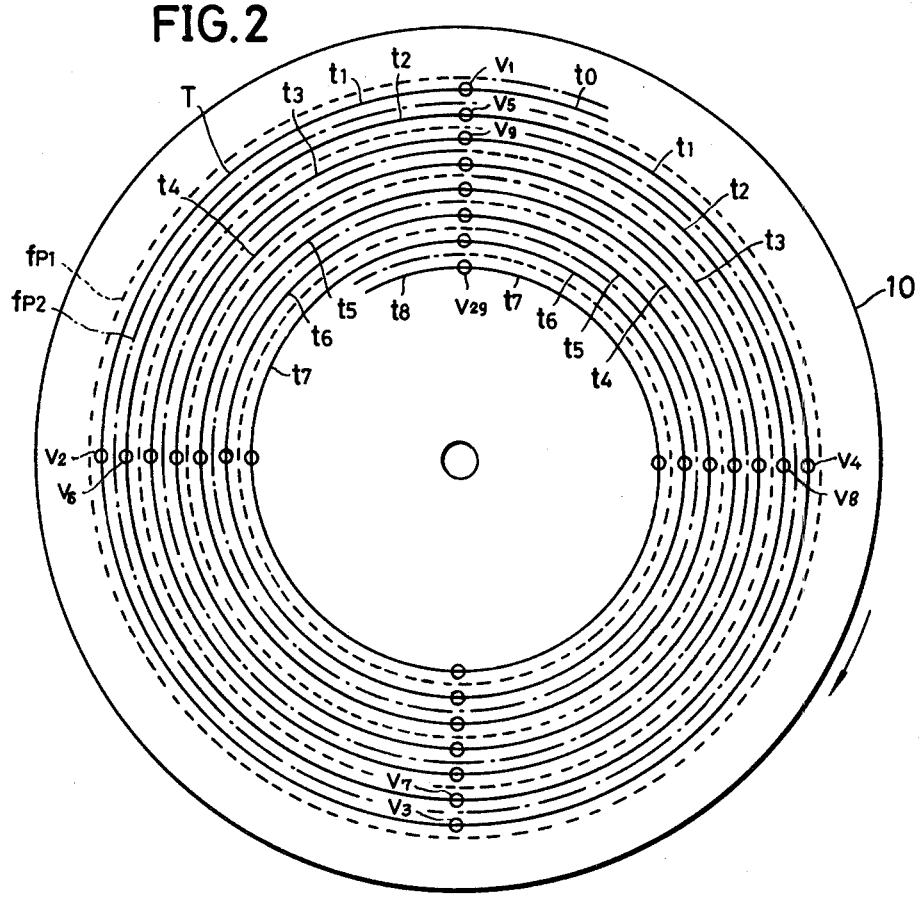
FIG. 2 is a diagram for explaining the recorded state of reference signals on a track pattern on a rotary recording medium.

As indicated in FIG. 2, a video signal is recorded along a spiral track T of the disc 10 for two frames, that is, four fields, per one revolution of the disc. In FIG. 2; the tracks of the reference signal fp1 is shown by dotted lines while the tracks of the reference signal fp2 is shown by one-dot chain lines. The positions of the vertical synchronizing signals of respective fields are designated by reference characters V1, V2, V3, ..., and the successive track parts corresponding to one revolution of the disc of a single spiral track I are respectively designated by track turns $t_1, t_2, t_3, \ldots$. Furthermore, a third reference signal fp3 is recorded at the starting end positions V1, V5, V9, ... of each track turns $t_1, t_2, t_3, \ldots$, that is, at positions where the reference signals fp1 and fp2 change over.

Figure 1:
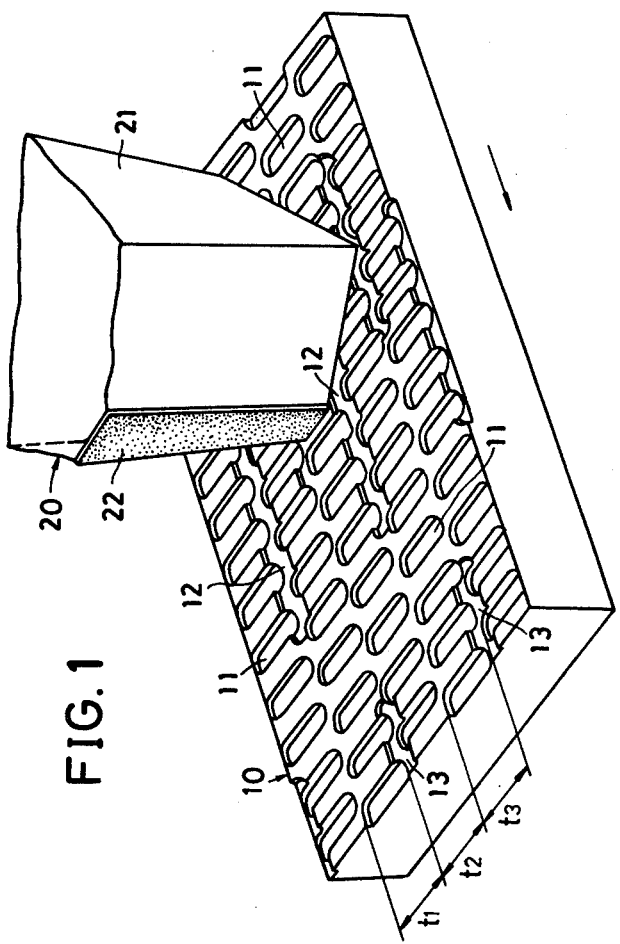
FIG. 1 is a perspective view showing a part of a rotary recording medium in an enlarged state together with a tip end part of a reproducing stylus.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
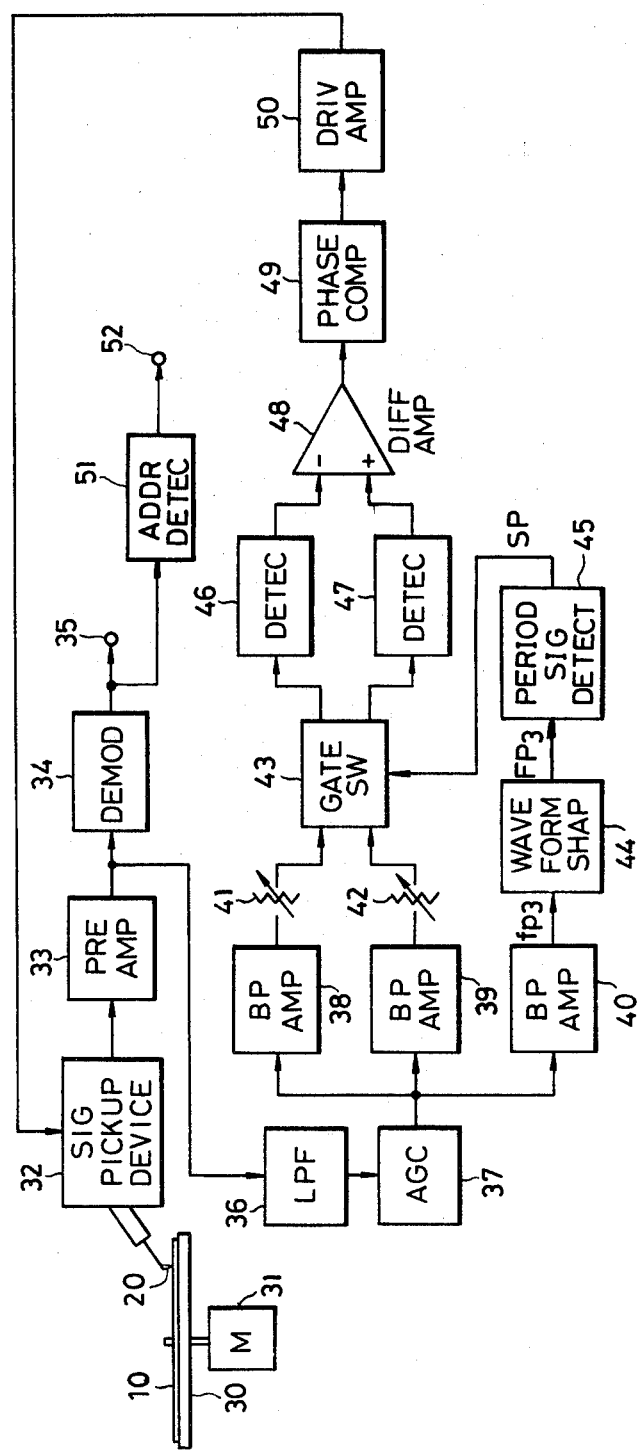
FIG. 3 is a systematic block diagram showing an example of a rotary recording medium reproducing apparatus applied with a periodical signal detection circuit according to the present invention.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signals are adjusted. The resulting signals are then supplied to a gate switching circuit 43.

The reference signal fp3 separated and amplified at the above band-pass amplifier 40, is supplied to a waveform shaping circuit 44 comprising a Schmitt circuit. The signal thus supplied to the waveform shaping circuit 44 undergoes waveform-shaping so that the signal is not affected by noise and other influences. The reference signal fp3 thus subjected to the waveform-shaping, is supplied to a periodical signal detection circuit 45 of the present invention. An output signal of the above detection circuit 45 is supplied to the gate switching circuit 43 as a switching pulse SP.

The gate switching circuit 43 performs switching of the reference signals fp1 and fp2 every one revolution period of the disc 10 upon normal reproduction, in response to the above switching pulse SP applied thereto. Hence, due to the switching pulse SP which reverses polarity every two frames (1/15 seconds), the reference signals fp1 and fp2 are always respectively supplied to wave detecting circuits 46 and 47 with predetermined polarities, from the gate switching circuit 43.

The detecting circuits 46 and 47 detect the envelopes of their respective input reference signals, and convert the input reference signals into DC voltages. These DC voltages are then supplied to a differential amplifier 48. The differential amplifier 48 compares the output signals of the two detecting circuits 46 and 47 which vary in response to the reproduced levels of the reference signals fp1 and fp2, and generates an output tracking error signal which indicates the tracking error direction and the error quantity. This error signal passes through a phase compensation circuit 49 and is further amplified to a specific level by a driving amplifier 50.

The output signal of the driving amplifier 50 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

The disc 10 shown in FIG. 1 is not formed with grooves for guiding the reproducing stylus 20. Hence, tracking must be performed so that the reproducing stylus 20 accurately traces over each track, and it becomes necessary to accurately obtain the tracking error signal. Accordingly, the above switching signal must be accurately obtained.

Next, description will be given with respect to an embodiment of the periodical signal detection circuit 45 according to the present invention, which is capable of accurately obtaining the switching signal, by referring to FIG. 4.

A reference clock generator 60 generates a clock signal having a predetermined frequency of approximately 115 kHz, for example. The clock pulse thus generated, is supplied to a counter 61. The counter 61 counts the clock signal supplied thereto, and produces a pulse signal $f_i$ shown in FIG. 5.

In the present embodiment of the invention, it is assumed that the reproducing apparatus is capable of performing reproduction from a normal-speed reproduction through a 65-times speed reproduction in which reproduction is performed with a speed which is sixty-five times that upon normal reproduction. During the above 65-times speed reproduction, the reproducing stylus 20 is kicked to an adjacent track at sixty-four positions for one revolution of the disc 10. Accordingly, sixty-four positions are required at which the above kick operation can be performed, for each track turn of the disc 10.

On the other hand, a chapter address signal is recorded in the disc 10. The chapter address signal comprises a program number for every unit of program of the recorded information signal. As indicated in FIG. 6, a chapter address signal 80 comprises synchronizing bits 81, program number bits 82, local address bits 83 which indicate a position within each program number, and parity bits 84. A program number identified by the program number bits 82 of the chapter address signal 80, is the same number within the same program. Moreover, the above chapter address signal 80 is recorded at positions every ¼ track turn of the disc 10, that is, at positions corresponding to ¼ rotational period of the disc 10. The chapter address signal 80 is detected since the output signal of the demodulator 34 shown in FIG. 1 is supplied to an address signal detection circuit 51, and the chapter address signal 80 is obtained through an output terminal 52.

In order to accurately obtain the above chapter address signal 80, it becomes necessary to prevent the reproducing stylus 20 from kicking during detection of the chapter address signal. Accordingly, in the present embodiment of the invention, one track turn of the disc 10 is divided into seventy-two sections ($=64+2\times4$). That is, each ¼ track turn is divided into eighteen sections. With respect to the above ¼ track turn, sixteen positions out of the eighteen divided positions are used as kick positions of the reproducing stylus 20. Hence, at two positions immediately before the vertical synchronizing signal position, the reproducing stylus 20 is not kicked so that the chapter address signal 80 can be detected. Therefore, the pulse signal $f_i$ shown in FIG. 5 is a signal in which pulses exist for the first through the sixteenth positions of the ¼ rotational period which is divided into eighteen sections, and no pulses exist for the remaining two positions.

Although not shown in the figures, a micro-computer for reading in key inputs and a micro-computer for controlling the operation of the reproducing apparatus, that is, a total of two micro-computers are used in the present embodiment of the invention. When the pulse signal $f_i$ is supplied to the micro-computer for controlling the operation of the reproducing apparatus, other processing operations are interrupted to discriminate on whether the reproducing stylus is to be kicked, according to data obtained from the other micro-computer. In a case where the reproducing stylus is to be kicked, a positive polarity pulse and a negative polarity pulse is alternately produced from the above micro-computer which controls the operation of the reproducing apparatus. Data transfer is performed between the two micro-computers during the period corresponding to the two positions where the pulse signal $f_i$ does not exist.

The output pulse signal $f_i$ of the counter 61 is supplied to a 1/64 counter 62. Every time the above counter 62 counts sixty-four pulses of the pulse signal $f_i$ and returns the count to zero, the outputs of the counter 62 all become of high levels. Moreover, a pulse is produced from an AND-gate 63.

On the other hand, the output of the counter 62 is supplied to a decoder 64. Hence, window signals S1, S2, and S3 respectively having widths shown in FIGS. 7 (A), 7 (B), and 7 (C) are respectively produced through output terminals 65A, 65B, and 65C of the decoder 64.

A width M of the above output window signals can be described by an equation $M=2N+1$. FIGS. 7 (A), 7 (B), and 7 (C) correspond to cases where N=0, 1, 2, that is, for the cases where the width M=1, 3, 5. The output window signal S1 shown in FIG. 7 (A) is equal to the output pulse of the AND-gate 63. A switch 66 is switched over and controlled by a counter 67, to make contact with either one of the output terminals 65A through 65C.

The third reference signal fp3 is recorded at one position for one track turn. Therefore, the repetitive frequency of the third reference signal fp3 which is reproduced and subjected to the waveform-shaping is 15 Hz, and the output pulse frequency of the AND-gate 63 accordingly becomes 15 Hz. The above output pulse of the AND-gate 63 is supplied to the counter 67 and an OR-gate 68.

On the other hand, the third reference signal fp3 obtained from the waveform shaping circuit 44 is supplied to an AND-gate 70 and an AND-gate 72, through a terminal 69.

At the instant when the reproducing stylus 20 is lowered onto the disc 10 to start a reproducing operation, the signal from the output terminal 65A of the decoder 64 and the reference signal fp3 obtained from the terminal 69 are not in synchronism with each other. Moreover, no output is obtained from the AND-gate 70. The output pulse of the AND-gate 63 which has passed through the OR-gate 68 is applied to reset terminals 61a and 62a of the counters 61 and 62. Thus, the counters 61 and 62 are reset by the output pulse of the AND-gate 63, and start a new counting operation. Since no output is obtained from the AND-gate 70, the counter 67 is not reset. Accordingly, the counter 67 continues to count the output pulse of the AND-gate 63.

When the counter 67 counts the output pulse of the AND-gate 63 once (N=1), the switch 66 is switched over and connected to the side of the output terminal 65B due to a switching control signal supplied from the counter 67. Hence, the window signal S2 having the width of M=3 shown in FIG. 7 (B), is applied to the AND-gate 70 from the output terminal 65B.

In a case where the reference signal fp3 is not obtained from the terminal 69 during the period in which the window signal S2 is applied to the AND-gate 70, no output is introduced at the AND-gate 70. Accordingly, the counter 67 is not reset.

When the counter 67 further counts the output pulse of the AND-gate 63 (for a total of two times, that is, N=2), the switch 66 is switched over and connected to the side of the output terminal 65C due to the switching control signal supplied from the counter 67. Hence, the window signal S3 having the width of M=5 shown in FIG. 7 (C), is applied to the AND-gate 70 from the output terminal 65C.

For example, when the reference signal fp3 is obtained from the terminal 69 during the period in which the window signal S3 whose width of the window has been lengthened is applied to the AND-gate 70, an output pulse corresponding to the reference signal fp3 is obtained from the AND-gate 70.

The output pulse of the AND-gate 70 is obtained from an output terminal 73 as the switching pulse SP through the OR-gate 68. Moreover, the above output pulse of the AND-gate 70 is applied to the reset terminals 61a and 62a of the counters 61 and 62 to reset these counters 61 and 62.

Therefore, the counters 61 and 62 thereafter produce a signal synchronized with the reference signal fp3. Furthermore, the switch 66 is switched over and connected to the side of the output terminal 65A, since the counter 67 is reset. Accordingly, the switching pulse SP which is synchronized with the reference signal fp3 is obtained from the output terminal 73.

In the description above, it was described that the reference signal fp3 is obtained when the counter 67 counts two times, that is, when the window signal S3 having the width of M=5 is applied to the AND-gate 70. However, the above description also stands for the case where the reference signal fp3 is obtained when the counter 67 counts once and the window signal S2 having the width of M=3 is applied to the AND-gate 70.

When the noise component is obtained during the period in which the window signal S1, S2, or S3 is applied to the AND-gate 70 from the above output terminal 65A, 65B, or 65C and the gate of the AND-gate 70 is open, before synchronism is obtained with respect to the reference signal fp3, the counters 61 and 62 produce a pulse which is synchronized with the noise component. However, the noise component is generally at random and is not periodical. Hence, the synchronization is not continuously obtained with respect to the noise component, and synchronism can gradually be obtained with respect to the reference signal fp3. Since the reference signal fp3 is a periodical signal, synchronism is continuously obtained with respect to the reference signal fp3 once synchronism is obtained with respect to the reference signal fp3.

In addition, in a case where the counter 67 counts two times and the window signal S3 having the width of M=5 is supplied to the AND-gate 70 but the reference signal fp3 is not obtained within the interval of the above width, the counter 67 counts one more time, that is, for a total of three times. The outputs of the above counter 67 then all become of high levels, and the output from an AND-gate 71 is supplied to the AND-gate 72 to open the AND-gate 72. When the reference signal fp3 is obtained in the above described state, the reference signal fp3 is obtained from the output terminal 73 as the switching pulse SP through the AND-gate 72 and the OR-gate 68. Moreover, the above reference signal fp3 is also applied to the counters 61 and 62 to reset these counters 61 and 62.

When the noise component is obtained first before the reference signal fp3 is obtained during the period in which the AND-gate 72 is in an open state, the counters 61 and 62 become synchronized with the noise component. In this case, the above described operations are repeated. However, since the noise component is not periodical as described above, synchronism is eventually obtained with respect to the reference signal fp3. In reality, the time required until the synchronism with respect to the reference signal fp3 is obtained by lowering the reproducing stylus 20 onto the disc 10, is approximately one second at the maximum.

Therefore, according to the circuit of the present invention, the width of the window in the window signals S1 through S3 which are used for opening the AND-gate 70, is successively lengthened every time the counter 67 counts once. Hence, the synchronism with respect to the reference signal fp3 can be obtained within a short period of time, without being greatly affected by the noise component.

Even when a noise component is introduced from the terminal 69 between one reference signal fp3 and a following reference signal fp3, this noise component does not coincide with the output pulse obtained through the output terminal 65A. Thus, the noise component does not pass through the AND-gate 70. In addition, the counter 67 is reset before the counter 67 counts the output pulses of the AND-gate 63 three times (in a normal state, when the pulse is counted once). Hence, the AND-gate 72 is not open, and the noise component from the terminal 69 does not pass through the AND-gate 72. Accordingly, once synchronism is obtained with the reference signal fp3, the noise component does not introduce any affection.

In a case where the reference signal fp3 is dropped out due to some causes and not reproduced during reproduction, no output is obtained from the AND-gate 70. However, the output pulse of the AND-gate 63 which is already in synchronism with the previous reference signal fp3 is directly obtained through the output terminal 73 as the switching pulse SP, through the OR-gate 68. Moreover, the output pulse of the OR-gate 68 is also supplied to the reset terminals 61a and 61b of the counters 61 and 62 to reset the counters 61 and 62. Therefore, even when dropout of the reference signal occurs, the switching pulse SP can always be obtained in a normal manner.

When the reference signal fp3 is dropped out more than three times, the AND-gate 72 opens according to the output of the counter 67, and an operation similar to that performed upon starting of the reproduction is thereafter performed. However, it is very unlikely that the reference signal is actually dropped out a plurality of times, and the probability for this to occur is exceedingly small.

The above description were given with respect to the operation from the time when the reproducing stylus 20 is lowered onto the disc 10 until synchronism with respect to the reference signal fp3 is obtained. However, an operation similar to that performed in the above case is also performed when the disc 10 slides and relatively undergoes rotational displacement on the turntable 30 due to some external shock and the like exerted against the reproducing apparatus, during the period in which normal reproduction is performed wherein synchronism is obtained with respect to the reference signal fp3. That is, when the disc 10 is rotationally displaced as described above, the position of the reference signal fp3 shifts, and the synchronism is lost. However, a search is performed to locate the reference signal fp3 by enlarging the range in which the AND-gate 70 performs the AND-operation, by use of the window signal such as the window signals S2 and S3 which has a window whose width is wider than that of the window signal S1. When synchronism is again obtained with respect to the reference signal fp3, the window signal (AND-gate signal) is returned to the window signal S1 having the window of a narrow width.

When synchronism cannot be obtained with respect to the reference signal fp3, the period in which the reference signal fp3 can be detected is successively lengthened by the successive use of the window signals S2 and S3, as described above. Thus, compared to a case where a wide detection period is obtained by abruptly opening the AND-gate 72 to leave the AND-gate in an open state, the possibility of erroneously obtaining synchronism with the noise component is small and the synchronism with respect to the reference signal fp3 can be effectively and accurately obtained in the case where the position of the reference signal fp3 is slightly shifted.

In actual use, the operation similar to that performed by the circuit system shown in FIG. 4, is performed by a micro-computer.

Further, the present invention is not limited to these embodiments, but various variations and modifications may be made without departing from the scope of the invention.

What is claimed is:

1. A periodical signal detection circuit in an apparatus which reproduces an information signal and a periodical signal from a recording medium having both periodic signals and information signals recorded thereon, said periodical signal detection circuit comprising:

separation circuit means coupled to receive signals reproduced from said recording medium for separating said periodical signal from the signals reproduced from said recording medium, said periodical signal being a series of pulses;

reference pulse generating circuit means for generating reference pulses having a repetition frequency which is the same as the repetition frequency of said periodical signal;

window signal forming circuit means for forming window signals respectively having different widths, with repetition period identical to the repetition frequency of said reference pulse and of said periodicl signals;

first gate circuit means for producing said periodical signals, responsive to the separated periodical signal received from said separation circuit means and to the window signal received from said window signal forming curcuit means;

first counter means coupled to said reference pulse generating circuit and reset in response to each of the pulses of said periodical signal, for continuing a count of said reference pules from said reference pulse generating circuit during an interval in which the pulse of said periodical signal is absent, said first counter producing a switching control signal according to the count therein;

window signal supplying means responsive to the switching control signal from said first counter means for supplying to said first gate circuit means a window signal, among said window signals produced by said window signal forming circuit means at the repetition frequency of said periodic signals said supplied window signal having a width corresponding to the switching control signal;

second gate circuit means coupled to said separation circuit means and to said first counter means for passing the periodic signal from said separation circuit means according to the output of said first counter means; and output circuit means for producing said reference pulses, the output of said first gate circuit means, or the output of said second gate circuit means as a detected periodical signal.

2. A periodical signal detection circuit as claimed in claim 1 in which said window signal supplying means has a switching circuit operated responsive to the switching control signal from said first counter means, for switching and supplying window signals having different widths which are obtained from said window signal forming circuit means to said first gate circuit means.

3. A periodical signal detection circuit as claimed in claim 1 in which said window signal supplying means supplies a window signal having a width which is successively lengthened according to the switching signal supplied thereto every time said first counter means counts up once.

4. A periodical signal detection circuit as claimed in claim 3 in which a width M of the window signal supplied to said first gate circuit by said window signal supplying means is described by an equation $M=2N+1$, where N is an integer indicating the count in said first counter.

5. A periodical signal detection circuit as claimed in claim 1 in which said reference pulse generating circuit means and said window signal forming circuit means respectively produce a reference pulse and a window signal respectively having a phase corresponding to a signal from said output circuit responsive to a use of said signal obtained from said output circuit means.

* * * * *

UNITED STATES PATENT AND TRADEMARK OFFICE
CERTIFICATE OF CORRECTION

PATENT NO. : 4,472,795
DATED : September 18, 1984
INVENTOR(S) : Hiroyuki Sugiyama, ET AL.

It is certified that error appears in the above-identified patent and that said Letters Patent is hereby corrected as shown below:

Claim 1, Column 9, Line 29, change "periodicl" to --periodic--.
Claim 1, Column 9, Line 34, change "curcuit" to --circuit--.
Claim 1, Column 9, Line 38, change "pules" to --pulses--.
Claim 1, Column 10, Line 4, after "signals" insert --,-- (comma).

Signed and Sealed this

Ninth Day of July 1985

[SEAL]

Attest:

DONALD J. QUIGG

*Attesting Officer*  *Acting Commissioner of Patents and Trademarks*